July 13, 1965 H. J. LOVEGROVE 3,193,896
TAUT SUSPENSION SYSTEM
Filed Oct. 15, 1963
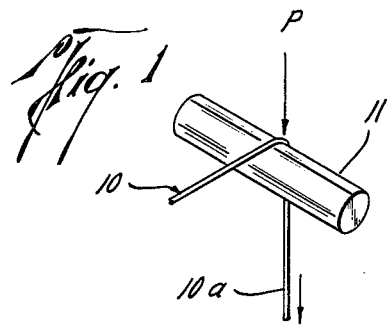
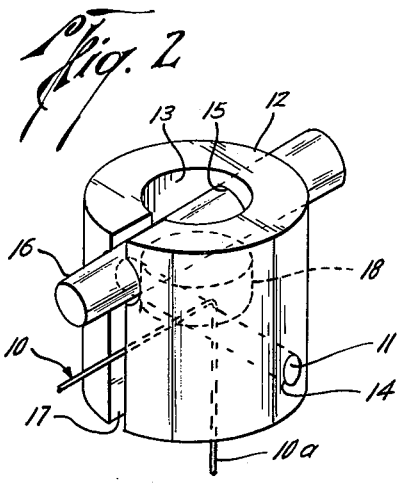
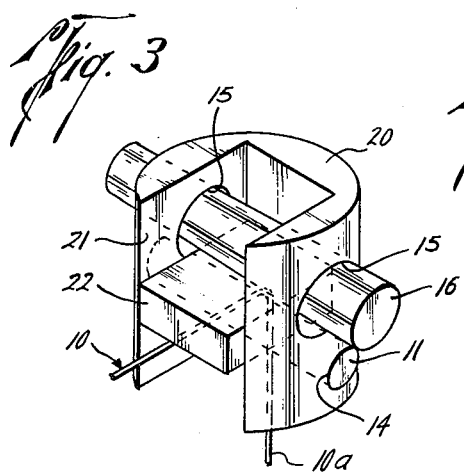
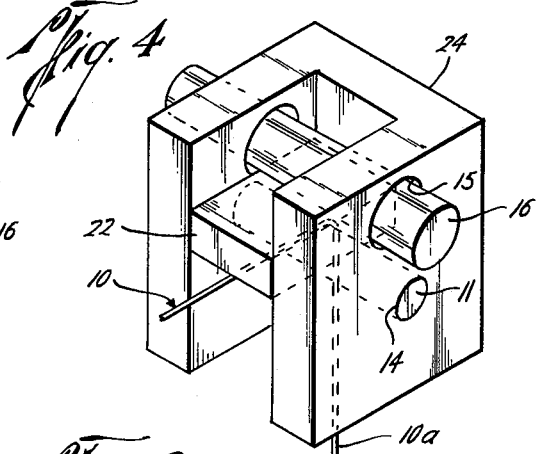
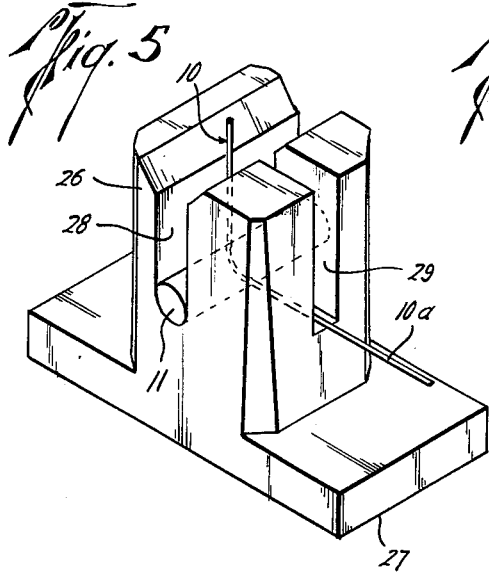
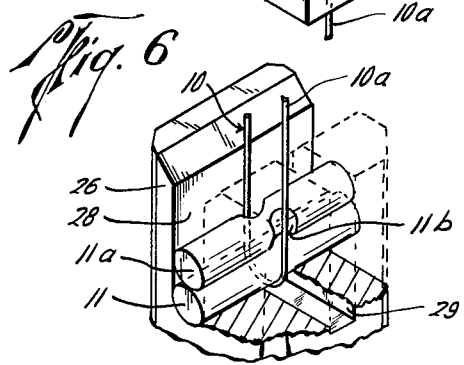
Henry Joseph Lovegrove
INVENTOR.
BY Michael F. Breston
ATTORNEY United States Patent Office 3,193,896
Patented July 13, 1965

3,193,896
TAUT SUSPENSION SYSTEM
Henry Joseph Lovegrove, Hadley Wood, Barnet, England, assignor to Weston Instruments, Inc., a corporation of Texas
Filed Oct. 15, 1963, Ser. No. 316,321
Claims priority, application Great Britain, Oct. 16, 1962, 39,153/62
4 Claims. (Cl. 24—126)

This invention relates to suspension arrangements for the moving element of an instrument such as the moving coil of an electrical measuring instrument and is more particularly concerned with arrangements of the taut suspension type in which fine wires, strips or the like extend under tension from opposite points of the moving element to fixed supports on the stationary part of the instrument.

In suspension arrangements of the known type, difficulties arise in anchoring the ends of the ligaments which constitute the suspension means, especially when these also form the means for conducting current to the moving element. Soldering of the ligament to suitable anchorage points is a conventional method of securing, but this involves the risk of altering the physical characteristics of the ligament owing to the heating which necessarily occurs; in addition it is difficult to perform, particularly with the very fine wires currently employed, without disturbing the previously adjusted tension applied to the ligament.

An object of the present invention is the provision of an improved suspension system and arrangements by which the precise and secure anchoring of a suspension ligament or the like may be effected after the application of the chosen degree of tension without the application of heat and without risk of altering the preadjusted tension or of subsequent displacement of the effective anchor points from their chosen correct positions.

Broadly in accordance with the invention the suspension ligament in the form of a wire or strip is passed around a part of the circumference of a cylindrical pin of chosen diameter whereby the part thereof acting as the suspension member extends tangentially from the pin surface and such wire or strip is secured by pressure applied in a direction substantially perpendicular to the pin axis to clamp the ligament to the surface of the pin at a position at least 40° displaced from the tangent point. Such clamping pressure is preferably applied through a clamping pad which, while free to move along the direction of pressure application, is restrained from possible movement in directions perpendicular to such pressure direction.

In order that the nature of the invention may be more readily understood a number of embodiments will now be briefly described by way of illustrative examples and with reference to the accompanying drawing wherein:

FIG. 1 shows the basic suspension arrangement in accordance with the invention. FIG. 2 is a perspective view of a preferred embodiment incorporating the suspension arrangement shown in FIG. 1. FIGS. 3 and 4 are modifications of the embodiment shown in FIG. 2. FIG. 5 is a perspective view of a simplified suspension system. FIG. 6 is a partial view in section of a modification of the embodiment shown in FIG. 5.

Referring first to FIG. 1, the suspension arrangement is basically one in which the wire-shaped suspension ligament 10 is held over a cylindrical roll pin 11 so that the part 10a of the ligament which extends in tension as the suspension link does so tangentially with respect to the pin surface. This ligament is required to be held securely so that it is free to pivot or roll on the pin without interference while being constrained against axial displacement along the pin either during the securing operation or subsequently. In addition, the clamping operation must not damage the ligament wire. Such clamping may be achieved by applying a suitable pressure force P in a direction substantially perpendicular to the pin axis.

One practical embodiment is shown in FIG. 2 and comprises a cylinder 12, conveniently of metal, having a coaxial bore 13. A pair of opposed holes 14 near one end receive, in tight fitting engagement, the cylindrical roll pin 11 while towards the opposite end of the cylinder 12 a second pair of holes 15 receives a tapered pin 16. An axially directed slot 17, lying in a plane substantially perpendicular to the roll pin 11, is provided in the cylinder wall. Slot 17 may, as shown, also pass through one of the holes 15. The axis of the holes 15 conveniently passes through the axis of the cylinder 12 but the axis of the holes 14 is offset from the axis of the cylinder 12 by an amount equal to the radius of the roll pin 11 plus half the diameter or thickness of the suspension ligament. A pressure pad 18, in the form of a thick disc of slightly smaller diameter than the bore 13, is disposed in such bore between the tapered pin 16 and the suspension ligament 10 lying around the roll pin 11.

In the operation of effecting clamping, the roll pin 11 is first inserted. The suspension ligament 10 is then passed up the bore 13 of the cylinder 12 to rest against the side of the roll pin in a location where it lies on the axis of the cylinder 12. The projecting upper end is then bent over the roll pin so that it passes out through the center of the slot 17. At this time the ligament may be tensioned to the required degree. The pressure pad 18 is then inserted through the top of the bore 13 to rest by its flat undersurface upon the suspension ligament lying upon the upper surface of the roll pin 11. The tapered pin 16 is then inserted to overlie the pad 18 and thereafter pushed home, e.g. by means of pliers or other suitable tool to force the pad into clamping engagement with the ligament lying on the roll pin.

While the preferred arrangement is as shown in FIG. 2 where the tapered pin is at right angles to the roll pin, this is not essential and the angle between the respective axes of the pins may be of any convenient value. FIG. 3 illustrates an alternative construction in which the two pins are parallel with one another. This construction is of simplified form, the hollow and slotted cylinder 12 of FIG. 1 being replaced by a solid cylinder 20 provided with a wide milled slot 21 therein. The pressure pad 22 is now rectangular and is a neat sliding fit within the slot. FIG. 4 shows yet another alternative in which the main body 24, replacing the parts 12 or 20 in the earlier embodiments, is of rectangular section channel form made by folding a suitably shaped blank.

Other means for applying the clamping pressure upon the pressure pad may be used. For example, in the form of construction shown in FIG. 2, the upper end of the bore 13 may be threaded for receiving a clamping grub screw bearing by its lower end upon the pad disc 18.

The materials employed, particularly for the roll pin 11 and the pressure pad 18 or 22, are chosen to avoid oxidation and destructive or damaging effects upon the ligament. Stainless steel has been found suitable for the roll pin 11 and silver for the pressure pad.

The constructions already described may be used at either or both ends of each suspension link but, since one end attachment can nearly always be pre-assembled, a simpler embodiment can often be used for that end, usually the one secured to the moving element, such as the moving coil of an electrical measuring instrument. Such further embodiment is shown in FIG. 5 and comprises a base pedestal 26 provided with a securing foot piece 27. The pedestal is formed with a transverse slot 28 so positioned that one side wall is in a plane which is displaced away from the desired axis line of the suspension ligament by an amount equal to half the ligament thickness. This slot is of such width that it provides an interference fit for a roll pin 11. The bottom of the slot 28 is of the same radius as the pin. On that side of the slot 28 adjacent the axis line of the suspension, the pedestal is provided with a central slot 29 at right angles to the slot 28 to define a T slot formation. This second slot is at least as deep as the slot 28. A roll pin 11, e.g. of stainless steel is made an interference fit in the slot 28.

In assembly, the suspension ligament 10 is first positioned to lie across the top of the pedestal in alignment with the center of the slot 29 and with the suspension link part 10a projecting in the direction of such slot 29. The roll pin 11 is then forced downwardly into the slot 28 right to the bottom thereof. As a result, the ligament 10 is clamped for 90° of the circumference of the pin 11 between such pin and the bottom of the slot. The part 10a of the ligament is then brought up through the slot 29 for attachment by its other end to the opposing anchorage point.

In another alternative, as shown in FIG. 6, a roll pin 11 which is smaller in diameter than the slot 28 may be used, this pin being followed by a wedge pin 11a which is an interference fit in the slot. A groove 11b is suitably provided in the wedge pin 11a at its center region to avoid any contact therewith by the upwardly extending part 10a of the ligament.

While I have illustrated and described the best forms of preferred embodiments of my invention, it will be apparent to those skilled in the art that changes may be made in the form of the apparatus without departing from the spirit of my invention as set forth in the appended claims.

What is claimed is:
1. A taut suspension mechanism comprising:
 an elongated pin having a curved surface,
 a flexible elongated ligament having a first and a second end, at least one of said ends being in tension, said ligament being supported by said pin in a plane substantially perpendicular to the longitudinal axis of said pin whereby said ligament embraces at least a portion of said curved surface,
 a base member in the form of a cylinder for supporting said pin at the extremities thereof, said base member defining a coaxial bore and a coaxial slot extending from said bore to the outer wall of said cylinder, said bore and said slot allowing for the free passage of said first and second ends of said ligament,
 a disk-shaped pad, and
 means including a wedge pin mechanically coupled to said base member for pressing said pad against at least a portion of said ligament which is in contact with said curved surface.
2. The suspension mechanism of claim 1 wherein the axes of said wedge pin and of said elongated pin are substantially perpendicular.
3. A taut suspension mechanism comprising:
 an elongated pin having a curved surface,
 a flexible elongated ligament having a first and a second end, at least one of said ends being in tension, said ligament being supported by said pin in a plane substantially perpendicular to the longitudinal axis of said pin whereby said ligament embraces at least a portion of said curved surface,
 a U-shaped base member for supporting said pin at the extremities thereof, thereby allowing for the free passage of said first and second ends of said ligament,
 a rectangularly-shaped pad, and
 means including a wedge pin mechanically coupled to said base member for pressing said pad against at least a portion of said ligament which is in contact with said curved surface.
4. The suspension mechanism of claim 3 wherein the axes of said wedge pin and of said elongated pin lie in substantially parallel planes.

References Cited by the Examiner

UNITED STATES PATENTS

| | | | |
|---|---|---|---|
| 2,146,575 | 2/39 | Hefftner | 24—126.1 |
| 2,267,231 | 12/41 | Coleman et al. | 24—115.5 |
| 2,345,641 | 4/44 | Van Sant | 24—126.1 |
| 2,544,086 | 3/51 | Herrington | 24—136 |

FOREIGN PATENTS 662,201  12/51  Great Britain.

DONLEY J. STOCKING, *Primary Examiner.*

BOBBY R. GAY, *Examiner.*